US007100148B2

(12) United States Patent
Schneider et al.

(10) Patent No.: US 7,100,148 B2
(45) Date of Patent: Aug. 29, 2006

(54) DEVELOPMENT COMPUTER, DEVELOPMENT PROGRAM FOR COMBINING COMPONENTS TO APPLICATIONS, USING COMPONENT DESCRIPTORS RELATED TO THE COMPONENTS, METHOD, AND COMPUTER PROGRAM

(75) Inventors: Manfred Schneider, Nussloch (DE); Achim Magel, Giessen (DE); Walter Kirchgaessner, Bad Schönborn (DE)

(73) Assignee: SAP AG, Walldrof (DE)

( * ) Notice: Subject to any disclaimer, the term of this patent is extended or adjusted under 35 U.S.C. 154(b) by 995 days.

(21) Appl. No.: 09/908,847

(22) Filed: Jul. 20, 2001

(65) Prior Publication Data

US 2002/0199005 A1 Dec. 26, 2002

Related U.S. Application Data

(60) Provisional application No. 60/276,878, filed on Mar. 16, 2001.

(51) Int. Cl.
*G06F 9/44* (2006.01)

(52) U.S. Cl. .................. 717/107; 717/103; 717/100

(58) Field of Classification Search ................ 717/107, 717/100, 177, 103, 108; 709/229, 200, 201
See application file for complete search history.

(56) References Cited

U.S. PATENT DOCUMENTS 5,737,606 A 4/1998 Cummins

| 6,044,224 A | 3/2000 | Radia et al. |
| 6,047,318 A | 4/2000 | Becker et al. |
| 6,138,171 A | 10/2000 | Walker |
| 6,601,234 B1* | 7/2003 | Bowman-Amuah ......... 717/108 |
| 6,868,434 B1* | 3/2005 | Terranova et al. .......... 709/203 |
| 2003/0051236 A1* | 3/2003 | Pace et al. .................. 717/177 |

OTHER PUBLICATIONS

Jorg Ackermann, "Das SAP-Paketkonzept—Erfahrungen bei der Modularisierung bestehender Anwendungssysteme", SAP Ag, Walldorf, Germany, Oct. 2000, 16 pages.

* cited by examiner

*Primary Examiner*—Tuan Dam
*Assistant Examiner*—Chih-Ching Chow
(74) *Attorney, Agent, or Firm*—Finnegan, Henderson, Farabow, Garrett & Dunner, L.L.P.

(57) ABSTRACT

In a process of developing software applications from software components, the validity of component interactions is automatically validated by a program that determines a permission statement for any given utilization of a server component (305) by a client component (307). In a predefined structure (211–272), descriptors (211–219) are assigned (231–239) to components (301–309), descriptors (220–225) are assigned (241–255) to descriptors (211–224), some descriptors (223) have declarations to components (305), and some descriptors (217) have declarations to descriptors (223). The permission statement is true when 4 predefined conditions are all in compliance. The conditions are defined in relation to a common descriptor (225), to client (217) and server (223) intermediate descriptors, and to first (261) and second (262) declarations.

16 Claims, 13 Drawing Sheets

DEVELOPMENT COMPUTER, DEVELOPMENT PROGRAM FOR COMBINING COMPONENTS TO APPLICATIONS, USING COMPONENT DESCRIPTORS RELATED TO THE COMPONENTS, METHOD, AND COMPUTER PROGRAM

This application claims the benefit of Provisional Application No. 60/276,878 filed Mar. 16, 2001.

FIELD OF THE INVENTION

The present invention generally relates to computer systems and, more particularly, relates to a development system for combining components to applications.

BACKGROUND OF THE INVENTION

Components are software entities comprising data structures and associated functions. By combining components to each other, one can provide complex application programs, for example, for use in a business organization. Components for the application program are usually stored in a common repository with thousands of prefabricated components. Usually, within the repository, the components are organized in groups. For example, components comprise instructions for a processor to execute a function, data used by the function, or both instructions and data.

Usually, the repository stores the components in source code form; a compiler converts the components into binary code before a processor executes the application.

Components highly depend on each other. Interaction between components can occur, for example, by sending messages or events that invoke functions by components. For convenience, the following uses "messages" collectively for "messages" and "events". Each component may have a protocol-defined set of messages that the component responds to. Encapsulated components hide their internal structure. This has advantages for the software vendor: only information regarding the interface of the component needs to be provided (i.e. describing the messages that the component responds to); the underlying code of the component has not to be revealed. Some components can delegate messages to another components.

Interaction between the components occur (a) between components inside the same group or (b) between components of different groups.

Groups, components and interactions are classified according to predetermined criteria. Preferably, the criteria are chosen to meet the needs of the organization or to ensure compliance with legal requirements. The criteria may limit component interaction. In other words, some interactions between components must be enabled, others must be disabled.

However, the interface (i.e. the protocol-defined set of messages of a prefabricated component) is difficult to be modified. A component might be updated from time to time. Modifying a single component often requires to modify other components in the same repository too. This is unwanted and especially true if the component interface changes.

In other words, logically integrating the component repository according to the criteria is of paramount importance, technically modularizing is required. There is a technical problem to (i) provide interaction means for the component without substantially changing them. Further, it is desired to provide technical means that shield humans from the details of connecting the components.

For the discussion of components, the following references are useful: U.S. Pat. Nos. 5,737,606; 6,047,318; 6,044,224; 5,737,606; 6,138,171; as well as "Jörg Ackermann, SAP AG, Walldorf (Baden), Germany: 'Das SAP—Paketkonzept—Erfahrungen bei der Modularisierung bestehender Anwendungssysteme', October 2000".

SUMMARY OF THE INVENTION

The present invention determines utilization permissions for predefined components by assigning descriptors to the components in a data structure. The structure comprises an assignment structure, a first declaration structure, and a second declaration structure. Preferably, the descriptors are physically stored separate from the components. Each component has its descriptor, one descriptor can belong to more than one components. A development program of the invention has two major portions. The first portion defines the descriptors (descriptor creation program, DCP). The second portion determines a permission statement (permission statement program PSP) by automatically evaluating the descriptors. A compiler operates conditionally depending on the statement.

As used herein, an organizer is a person who classifies components and interacts with the DCP. A developer is a person who creates the application by combining the components. The developer is optionally informed by the PSP about the statement. A user is a person who uses the compiled application, or, is optionally the person who causes the compiler to operate. Although distinguished here for convenience of explanation, it will be appreciated that the organizer, the developer and the user can be the same person.

As in claim 1, the present invention relates to a method for determining a permission statement for utilization in an application that has a plurality of components, utilization being predefined from a client component ("first component") to a server component ("second component"). The method comprises the steps of:

Reading a predefined structure, wherein descriptors are assigned to components, descriptors are assigned to descriptors, some descriptors have declarations to components, and some descriptors have declarations to descriptors;

setting the permission statement to a predefined value when all of the following conditions are true: (1) a common descriptor is assigned to the client component and to the server component, (2) the common descriptor is assigned to a client intermediate descriptor and to a server intermediate descriptor, wherein the client intermediate descriptor is assigned to the client component, and the server intermediate descriptor is assigned to the server component, (3) the server intermediate descriptor has a first declaration to the server component, and (4) the client intermediate descriptor has a second declaration to the server intermediate descriptor.

It is an advantage of the present invention to relieve the developer from classifying utilizations into desirable or undesirable. The developer does not need to write permission data into each component any longer. The permission statement is implicitly coded in the structure.

As in claim 2, preferably, the first declaration is a visibility declaration and the second declaration is a usability declaration.

As in claim 3, preferably, the descriptors store the visibility declaration in a visibility interface and store the usability declaration in a usability interface.

As in claim 4, preferably, in the setting step, the statement has at least a Boolean qualifier, and the predefined value is logical "true".

As in claim 5, preferably, the client intermediate descriptor is directly assigned to the client component.

As in claim 6, preferably, the step setting the permission statement comprises identifying the common descriptor as least deep commonly assigned descriptor; and identifying the client intermediate descriptor as being directly assigned to the client component and identifying the server intermediate descriptor such that the common descriptor is directly assigned to the server intermediate descriptor.

As in claim 7, preferably, the declarations are chain-declarations with linearly concatenated segments.

As in claim 8, a data structure to evaluate a software application with components is presented. The data structure implicitly has a permission statement for at least a single utilization of a server component by a client component, the data structure has descriptors that are independent from the components, the data structure is characterized in the following: in an assignment structure, descriptors are assigned to components, and descriptors are assigned to descriptors; in a first declaration structure, some descriptors have declarations to components, and in a second declaration structure, some descriptors have declarations to descriptors; the permission statement is only true when all of the following conditions are true: (1) in the assignment structure, a common descriptor is assigned to the client component and to the server component, (2) in the assignment structure, the common descriptor is assigned to a client intermediate descriptor and to a server intermediate descriptor, wherein the client intermediate descriptor is assigned to the client component, and the server intermediate descriptor is assigned to the server component, (3) in the first declaration structure, the server intermediate descriptor has a first declaration to the server component, and (4) in the second declaration structure, the client intermediate descriptor has a second declaration to the server intermediate descriptor.

As in claim 9, the present invention relates to a process of developing a software application from software components. The validity of component interactions is automatically validated, the process is performed in consecutive time slots with the following actions: In a first time slot, a first person uses a descriptor creation program to define descriptors in a data structure. In a second time slot, a second person writes the application by defining utilizations between the components. In a third time slot, a permission statement program automatically reads the application in combination with the descriptors and issues statements for each utilization. In a fourth time slot, depending on the statement, a compiler compiles the application.

As in claim 10, preferably, in the first time slot, the data structure has an assignment structure in that descriptors are assigned to components, and descriptors are assigned to descriptors; in a first declaration structure, some descriptors have declarations to components, and in a second declaration structure, some descriptors have declarations to descriptors; the permission statement (ACCESS) is only true when all of the following conditions are true: in the assignment structure, a common descriptor is assigned to the client component and to the server component, in the assignment structure, the common descriptor is assigned to a client intermediate descriptor and to a server intermediate descriptor, wherein the client intermediate descriptor is assigned to the client component, and the server intermediate descriptor is assigned to the server component, in the first declaration structure, the server intermediate descriptor has a first declaration to the server component, and in the second declaration structure, the client intermediate descriptor has a second declaration to the server intermediate descriptor.

As in claim 11, the present invention is summarized as a computer program product to determine a permission statement (ACCESS) for a predefined utilization from a client component to a server component in an application with a plurality of components. The computer program product has a plurality of instructions that cause a processor to perform the following steps:

reading a predefined structure wherein descriptors are assigned to components, descriptors are assigned to descriptors, some descriptors have declarations to components, and some descriptors have declarations to descriptors;

a first checking step to verify that a common descriptor is assigned to the client component and to the server component, a second checking step to verify that the common descriptor is assigned to a client intermediate descriptor and to a server intermediate descriptor, wherein the client intermediate descriptor is assigned to the client component, and the server intermediate descriptor is assigned to the server component, a third checking step to verify that the server intermediate descriptor has a first declaration to the server component, a fourth checking step to verify that the client intermediate descriptor has a second declaration to the server intermediate descriptor;

selectively setting the permission statement to a true value when all checking steps are completed successfully, and otherwise setting the permission statement to a false value.

As in claim 12, preferably, the computer program product causes the processor in the third checking step to read the first declaration as a visibility declaration, and in the fourth checking step, to read the second declaration as a usability declaration.

As in claim 13, preferably, the computer program product causes the processor to perform the step setting permission statement as follows: identifying the common descriptor as least deep commonly assigned descriptor; and identifying the first intermediate descriptor as being directly assigned to the first component and identifying the second intermediate descriptor such that the common descriptor is directly assigned to the second intermediate descriptor.

As in claim 14, the present invention relates to a development computer to determine a permission statement for a predefined utilization from a client component to a server component in an application with a plurality of components. The computer comprises: means for reading a predefined structure wherein descriptors are assigned to components, descriptors are assigned to descriptors, some descriptors have declarations to components, and some descriptors have declarations to descriptors; and means for setting the permission statement to a predefined value when all of the following conditions are true: (1) a common descriptor is assigned to the first component and to the second component, (2) the common descriptor is assigned to a first intermediate descriptor and to a second intermediate descriptor, wherein the first intermediate descriptor is assigned to the first component, and the second intermediate descriptor is assigned to the second component, (3) the second intermediate descriptor has a first declaration to the second component, (4) the first intermediate descriptor has a second declaration to the second intermediate descriptor.

As in claim 15, preferably, means for setting the statement do set the statement to at least a Boolean qualifier (ACCESS) in that the predefined value is true.

As in claim 16, preferably, means for setting the permission statement comprise: means for identifying the common descriptor as least deep commonly assigned descriptor; and means for identifying the first intermediate descriptor as being directly assigned to the first component and identifying the second intermediate descriptor such that the common descriptor is directly assigned to the second intermediate descriptor.

DETAILED DESCRIPTION OF THE INVENTION

The content of the following detailed description is conveniently divided into: computer equipment in general and in particular, program modules, permissions, time slots, components and group classification, elements of components, structure, application, method, and preferred embodiment. For convenience, a list of reference numbers is provided prior to the claims.

Computer Equipment in General

Figure 1:
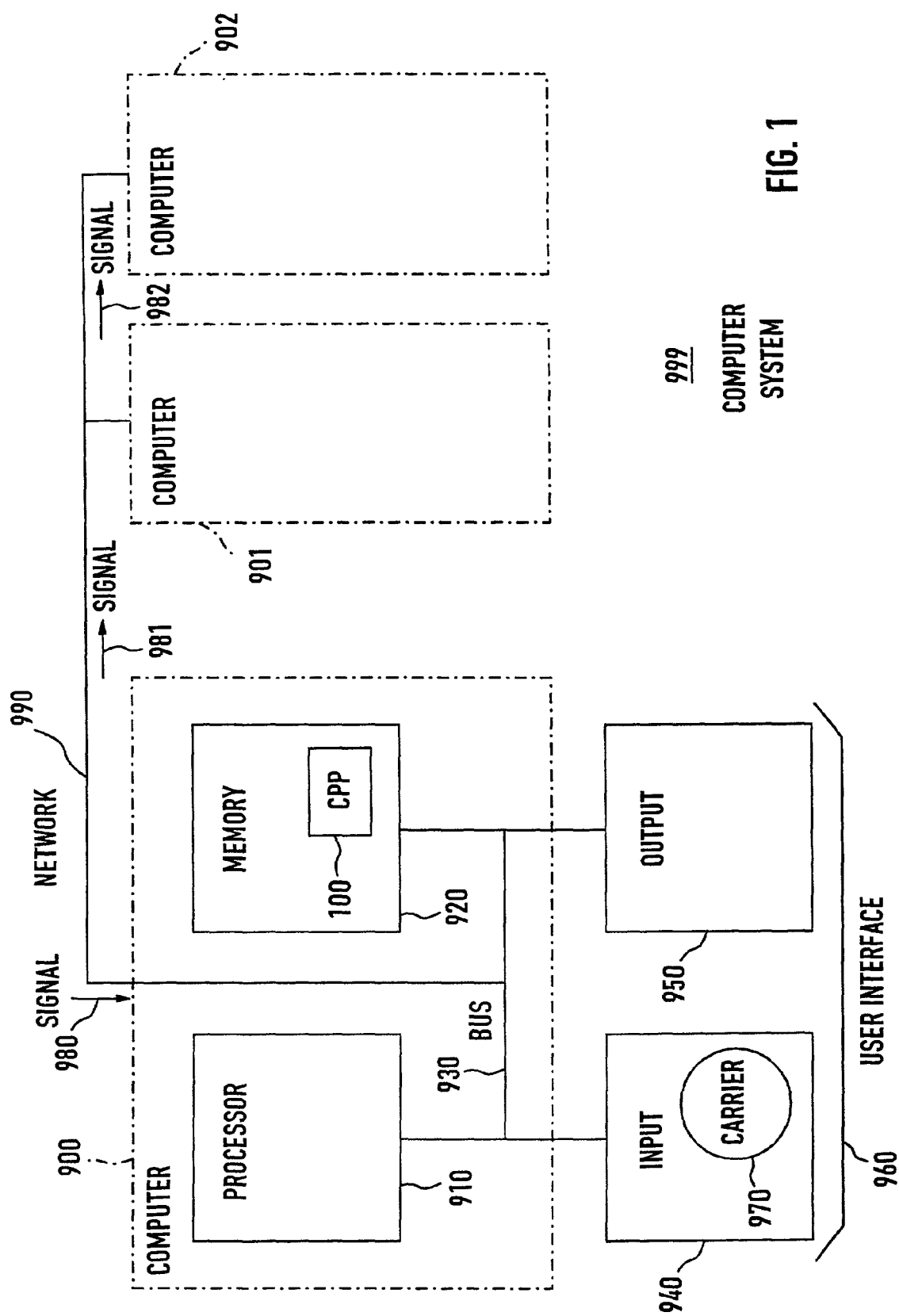
FIG. 1 illustrates a simplified block diagram of a computer system of the present invention.

FIG. 1 illustrates a simplified block diagram of computer system 999 of the present invention.

Computers 900–902 are coupled via inter-computer network 990. Computer 900 comprises processor 910, memory 920, bus 930, and, optionally, input device 940 and output device 950 (I/O devices, user interface 960). As illustrated, the invention is present by computer program product 100 (CPP), program carrier 970 and program signal 980, collectively "program".

In respect to computer 900, computer 901/902 is sometimes referred to as "remote computer", computer 901/902 is, for example, a server, a router, a peer device or other common network node, and typically comprises many or all of the elements described relative to computer 900. Hence, elements 100 and 910–980 in computer 900 collectively illustrate also corresponding elements $10q$ and $91q$–$98q$ (shown for q=0) in computers $90q$.

Computer 900 is, for example, a conventional personal computer (PC), a desktop and hand-held device, a multi-processor computer, a pen computer, a microprocessor-based or programmable consumer electronics, a minicomputer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 symbolizes elements that temporarily or permanently store data and instructions. Although memory 920 is conveniently illustrated as part of computer 900, memory function can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, such as, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, memory stick, or by any other media, like paper.

Optionally, memory 920 is distributed across different media. Portions of memory 920 can be removable or non-removable. For reading from media and for writing in media, computer 900 uses devices well known in the art such as, for example, disk drives, tape drives.

Memory 920 stores support modules such as, for example, a basic input output system (BIOS), an operating system (OS), a program library, a compiler, an interpreter, and a text-processing tool. Support modules are commercially available and can be installed on computer 900 by those of skill in the art. For simplicity, these modules are not illustrated.

CPP 100 comprises program instructions and—optionally—data that cause processor 910 to execute method steps of the present invention. Method steps are explained with more detail below. In other words, CPP 100 defines the operation of computer 900 and its interaction in system network system 999. For example and without the intention to be limiting, CPP 100 can be available as source code in any programming language, and as object code ("binary code") in a compiled form. Persons of skill in the art can use CPP 100 in connection with any of the above support modules (e.g., compiler, interpreter, operating system).

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture comprising a computer readable medium having computer readable program code means embodied therein for executing the method of the present invention. Further, program signal 980 can also embody computer program 100. Signal 980 travels on network 990 to computer 900.

Having described CPP 100, program carrier 970, and program signal 980 in connection with computer 900 is convenient. Optionally, program carrier 971/972 (not shown) and program signal 981/982 embody computer program product (CPP) 101/102 to be executed by processor 911/912 (not shown) in computers 901/902, respectively.

Input device 940 symbolizes a device that provides data and instructions for processing by computer 900. For example, device 940 is a keyboard, a pointing device (e.g., mouse, trackball, cursor direction keys), microphone, joystick, game pad, and scanner. Although the examples are devices with human interaction, device 940 can also operate without human interaction, such as, a wireless receiver (e.g., with satellite dish or terrestrial antenna), a sensor (e.g., a thermometer), a counter (e.g., goods counter in a factory). Input device 940 can serve to read carrier 970.

Output device 950 symbolizes a device that presents instructions and data that have been processed. For example, a monitor or other type of display, (cathode ray tube (CRT), flat panel display, liquid crystal display (LCD), a speaker, a printer, a plotter, a vibration alert device. Similar as above, output device 950 communicates with the user, but it can also communicate with further computers.

Input device 940 and output device 950 can be combined to a single device; any device 940 and 950 can be provided optional.

Bus 930 and network 990 provide logical and physical connections by conveying instruction and data signals. While connections inside computer 900 are conveniently referred to as "bus 930", connections between computers 900–902 are referred to as "network 990". Devices 940 and 950 are coupled to computer 900 by bus 930 (as illustrated) or by network 990 (optional). While the signals inside computer 900 are mostly electrical signals, the signals in network are electrical, magnetic, optical or wireless (radio) signals.

Networking environments (as network 990) are commonplace in offices, enterprise-wide computer networks, intranets and the internet (i.e. world wide web). The physical distance between a remote computer and computer 900 is not important. Network 990 can be a wired or a wireless network. To name a few network implementations, network 990 is, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

Transmission protocols and data formats are know, for example, as transmission control protocol/internet protocol (TCP/IP), hyper text transfer protocol (HTTP), secure HTTP, wireless application protocol, unique resource locator (URL), a unique resource identifier (URI), hyper text markup language HTML, extensible markup language (XML), extensible hyper text markup language (XHTML), wireless application markup language (WML), etc.

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides", are convenient abbreviation to express actions by a computer that is controlled by a program.

Computer Equipment in Particular

Figure 2:
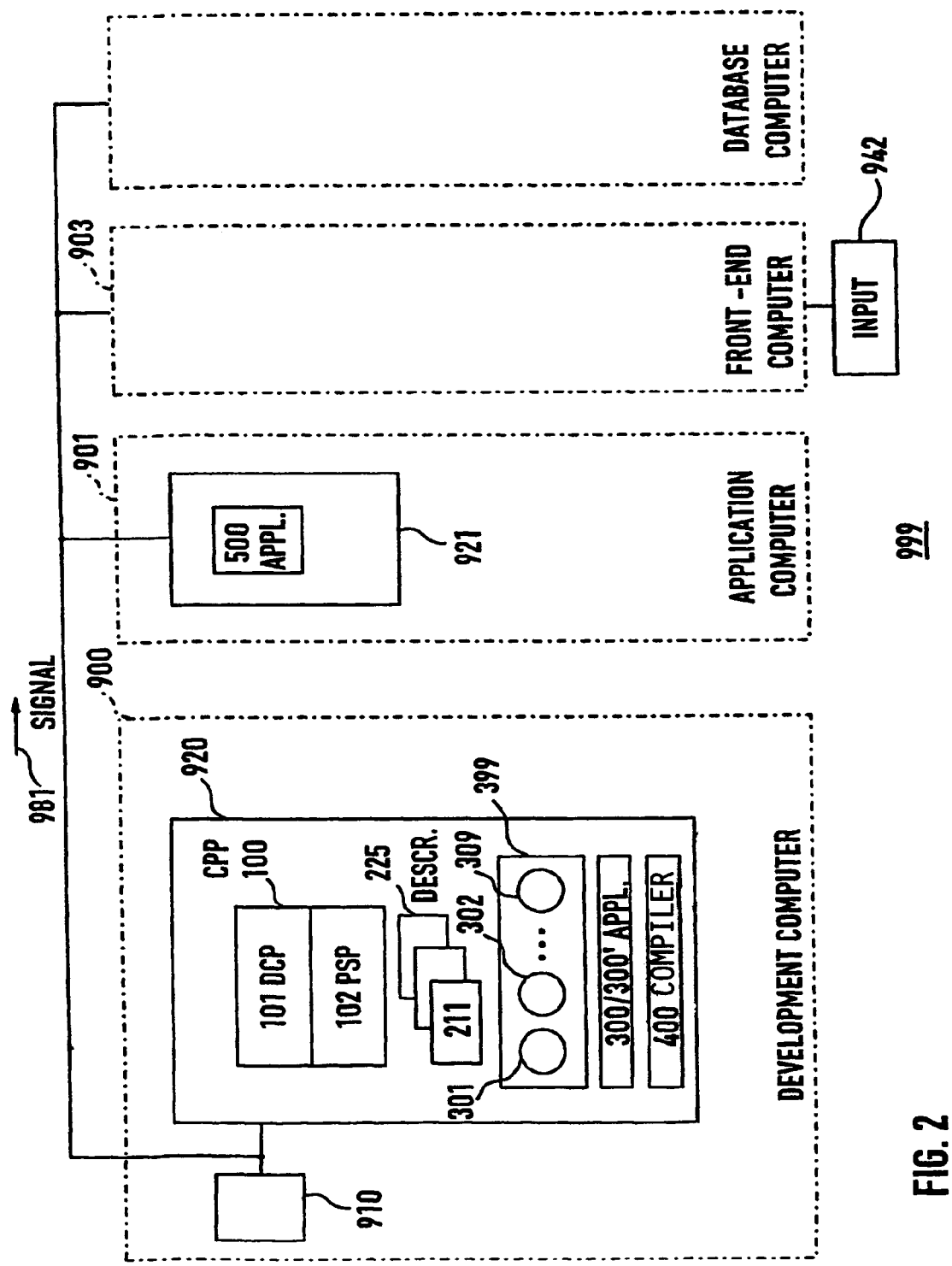
FIG. 2 illustrates a simplified block diagram of the computer system of FIG. 1 with more detail, also illustrating a development computer.

FIG. 2 illustrates a simplified block diagram of computer system 999 of FIG. 1 with more detail. For convenience, some elements such as busses and processors are left out.

Preferably, computer network system 999 is a 3-tier client-server system such as an R/3 system provided by SAP Aktiengesellschaft, Walldorf (Baden), Germany. Development computer 900 has processor 910 to execute development program 100 (i.e. CPP 100 with DCP 101 and PSP 102) and memory 920 to store development program 100, application 300, repository 399 with components 301–309, descriptors 211–225, and compiler 400. As used herein, the term "compiler" is a convenient abbreviation for any software module that transforms source code to binary code, and therefore includes interpreter, run-time environment, and utility. Input device 940 and output device 950 (illustrated in FIG. 1) are provided for interaction with the organizer and the developer. For convenience of explanation, it is assumed that components 301–309 are already available before running programs 101/102. The construction of components is well known in the art and therefore not detailed further.

Application computer 901 executes application 300/500. Computer 901 has memory 921 for storing application 500 and, optionally, program carrier 971 (e.g., CD-ROM) for storing application 500 outside computer 901. Program signal 981 transfers application 500 from development computer 900 to application computer 901.

Front-end computer 902 interacts with the user via input device 942. Database computer 903 is optionally provided for storing components 301–309 if memory 920 in computer 900 is not sufficient.

Program Modules

FIG. 2 further illustrates development program 100 with descriptor creation program 101 (DCP, first portion) and permission statement program 102 (PSP, second portion).

In repository 399, components 301–309 are provided in a programming language, such as ABAP (provided by SAP AG). For convenience, components 301–309 are illustrated by circle symbols. Using N=9 components for describing the invention is convenient; a real repository is much larger (e.g., N=1.000 . . . 100.000 or more). Descriptors 211–225, preferably, are without source code, for convenience, descriptors are illustrated with rectangles. Application 300 is a combination of components 301–309 (source code form). The developer can optionally modify application 300 to application 300' by adding, deleting, or modifying components. Compiler 400 converts application 300/300' from source code to binary code, compilers are commercially available and can be selected by a person of skill in the art. Application 500 is in component code form with executable instruction sequences.

Figure 3:
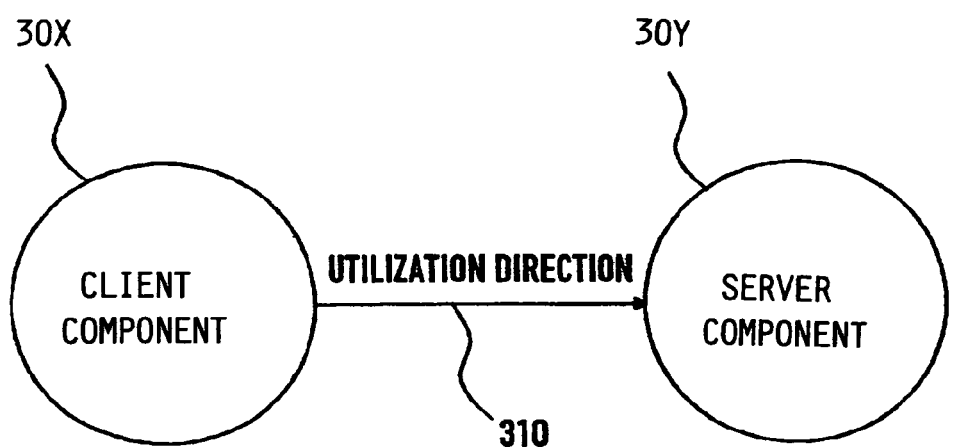
FIG. 3 illustrates a first component and a second component.

FIG. 3 illustrates first component 30X ("client component") and second component 30Y ("server component"), wherein X, Y=1 . . . 9 (cf. FIG. 2). Client component 30X utilizes server component 30Y. The developer determines what is "client" and what is "server"; for example, the developer writes syntax convention "client utilizes server", or "30X utilizes 30Y".

The term "utilize" (or its variations like "utilization") is collectively used for any action the developer wants client component 30X to interact with server component 30Y, such as, read, write, erase, copy, compare or paste. Such a utilization includes (but is not limited to) calls and code inclusions.

For example, if client component 306 should utilize server component 301 by reading from component 301, the developer writes: "306 READ 301"

The syntax of this expression is convenient for explanation, the developer can use any other expression that is equivalent, such as "all employee salary" READ "rate exchange". As used herein, utilizations are unidirectional utilizations; the term "utilization direction" indicates the direction from client to server. FIG. 3 indicates the utilization direction by arrow 310. The case where two components utilize each other is not discussed here for simplicity. Persons of skill in the art apply the same principles of the invention explained below.

Permissions

For N=9 components, the number M of the utilizations is calculated by a well-known formula as M=36 (M=N*(N−1)/2). M becomes huge for a real repository. The developer might define any of these M utilizations. M splits into a least two sets: M=M1+M2.

While compiler 400 does not compile a utilization of set M1 with an inconsistent action (e.g., comparing different currency values without considering exchange rates); compiler 400 does not reject a utilization of set M2 with a technically consistent action, but with an action that is undesired by the organizer.

As mentioned, PSP 102 evaluates descriptors 211–225 and provides the permission statement (mentioned above). According to the present invention, the statement classifies the permission of utilization. The statement is valid unidirectional in utilization direction (cf. arrow 310). Examples for classifications are:

"utilization always allowed", "utilization allowed after warning to the developer" "utilization allowed conditionally", "utilization allowed after confirmation by developer", or "utilization rejected".

For convenience, the following explanation uses a simple yes/no classification of only:

"utilization allowed" and
"utilization rejected"

The corresponding statement is, preferably, defined by the Boolean variable ACCESS being either true or false (logical "first" or "second" value), respectively. Following this convention, PSP 102 issues either 30X utilizes 30Y (ACCESS=TRUE), or
30X utilizes 30Y (ACCESS=FALSE)

It is an advantage of the present invention that ACCESS does not need to be stored in each component. Writing ACCESS for each pair of components would be inconvenient; the present invention provides ACCESS when needed.

Time Slots

Figure 4:
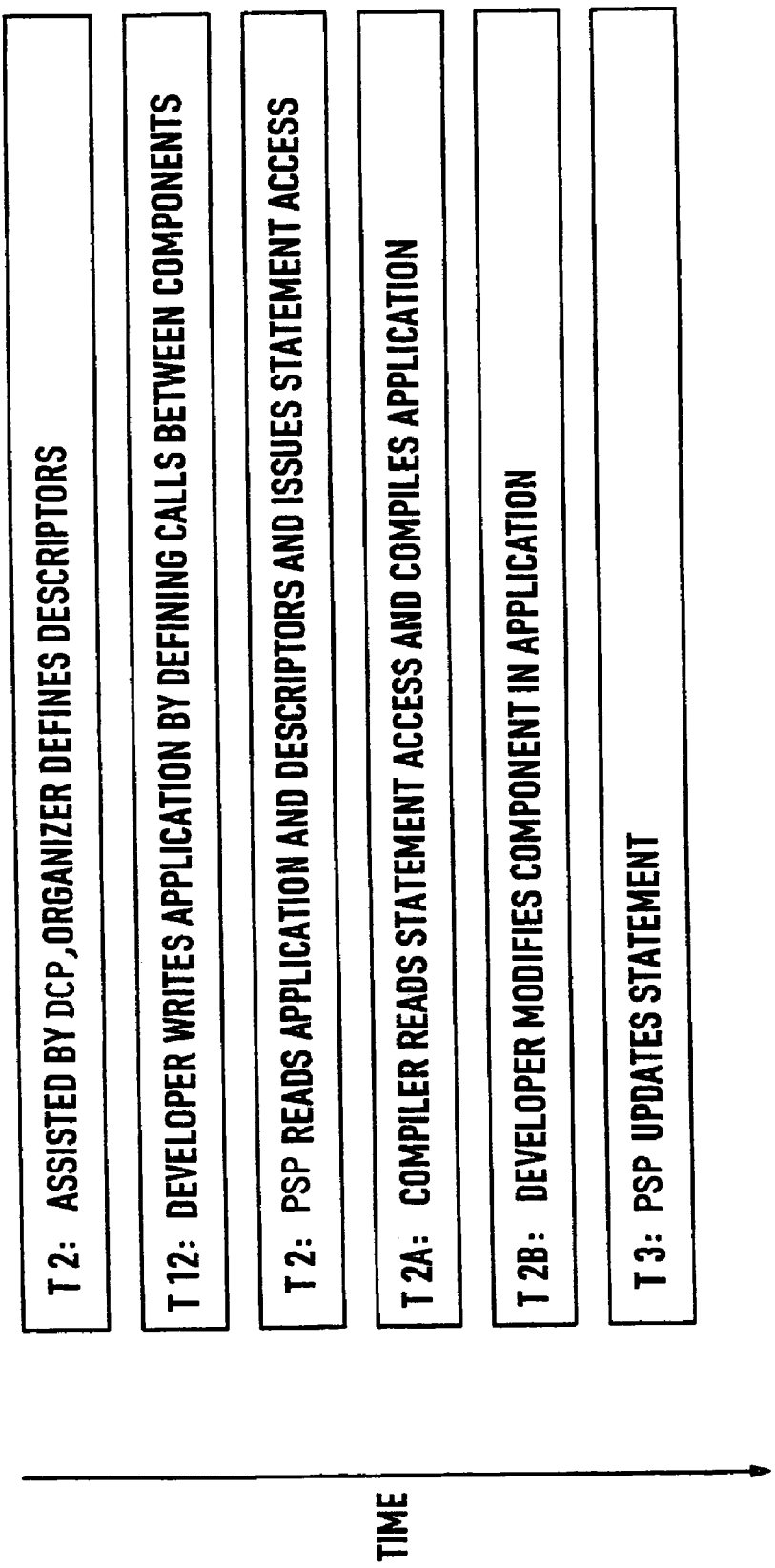
FIG. 4 illustrates a simplified time diagram of the availability of software modules and the action of programs according to the present invention.

FIG. 4 illustrates a simplified time diagram of the availability of software modules and the action of programs according to the present invention. For convenience of explanation, the time is divided into time slots T; the duration of each slot as well as the distance between consecutive slots are not important for the present invention.

T 1: According to the present invention, DCP 101 assists the organizer to define descriptors 211–225 (data structure 211–272);

T 12: The developer writes application 300 by defining utilizations between components 301–309 (T 12 can optionally extend before T 1);

T 2: According to the present invention, PSP 102 automatically reads application 300 in combination with descriptors 211–225 and issues the statement (e.g., ACCESS), preferably, for each utilization;

T 2A: Depending on the statement, compiler 400 compiles application 300 from source code to binary code (application 500);

T 2B: Optionally, the developer adds, removes or modifies a component in application 300 to obtain modified application 300'; and T 3: According to the invention, PSP 102 automatically reads modified application 300' and updates the statement.

As details are explained in connection with FIGS. 7–12, the data structure defined in T 1 has an assignment structure in that descriptors are assigned to components, and descriptors are assigned to descriptors; the data structure has first and second declaration structures and the permission statement is only true when all of the conditions (1) (2) (3) (4) are true.

Components and Group Classification

Figure 5:
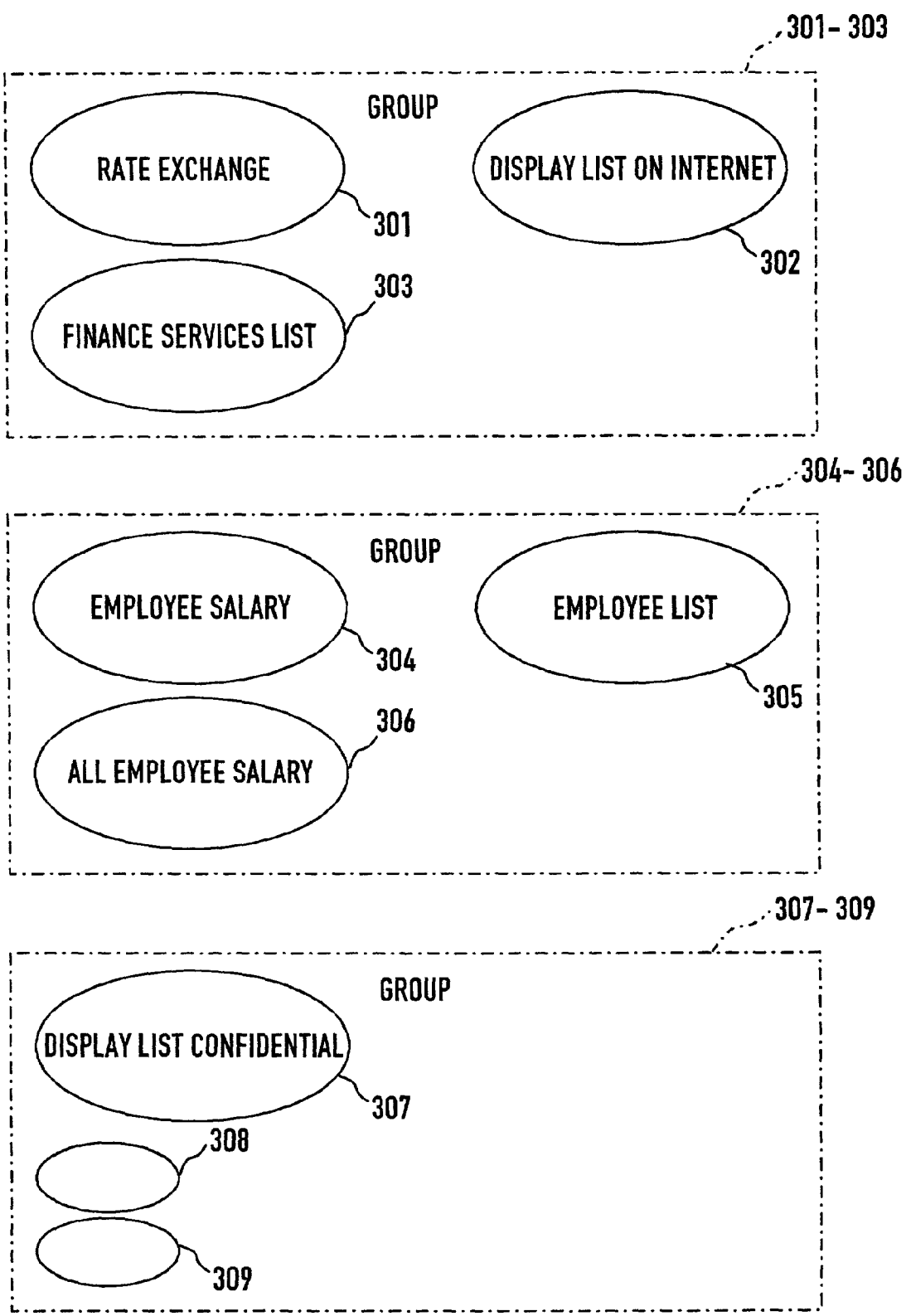
FIG. 5 illustrates components in logical groups.

FIG. 5 illustrates components 301–309. Memory 920 can store components 301–309 in adjacent or distant memory portions. Utilizations are not illustrated. For convenience of explanation, components are logically classified into groups 301–303, 304–306 and 307–309.

Groups 301–303, 304–306 and 307–309 are classified, for example, according to departments in the organization into "Finance", "Human Resource", and "Customer Relation Management", respectively.

In group 301–303 "Finance", component 301 "rate exchange" reads an input currency value (e.g., 10 EUR) and a currency pair (e.g., EUR to USD) as input data and provides an output currency value (e.g., 10 USD). Component 301 reads a table "actual exchange rates" that is updated daily. Details are explained below. Component 301 "display list on internet" provides a list in HTML-format for presenting to the general public. Component 303 "finance services list" is a list of finance services offered by the organization to the general public.

In group 304–306, component 304 "employee salary" reads a name of an employee as input and provides a numeric value for his or her salary. Component 305 "employee list" provides a list of all employees. Component 306 "all employee salary" interacts with components 304 and 305 (inter-group) and provides a report concerning the overall salary. Suppose that component 306 provides the report with indications in EUR and in USD. Preferably, component 306 uses services of component 301.

In group 307–309, component 307 "display list CONFIDENTIAL" provides a list on a screen or on printer and labels the list "CONFIDENTIAL". Components 308 and 309 have any other functions.

Figure 6:
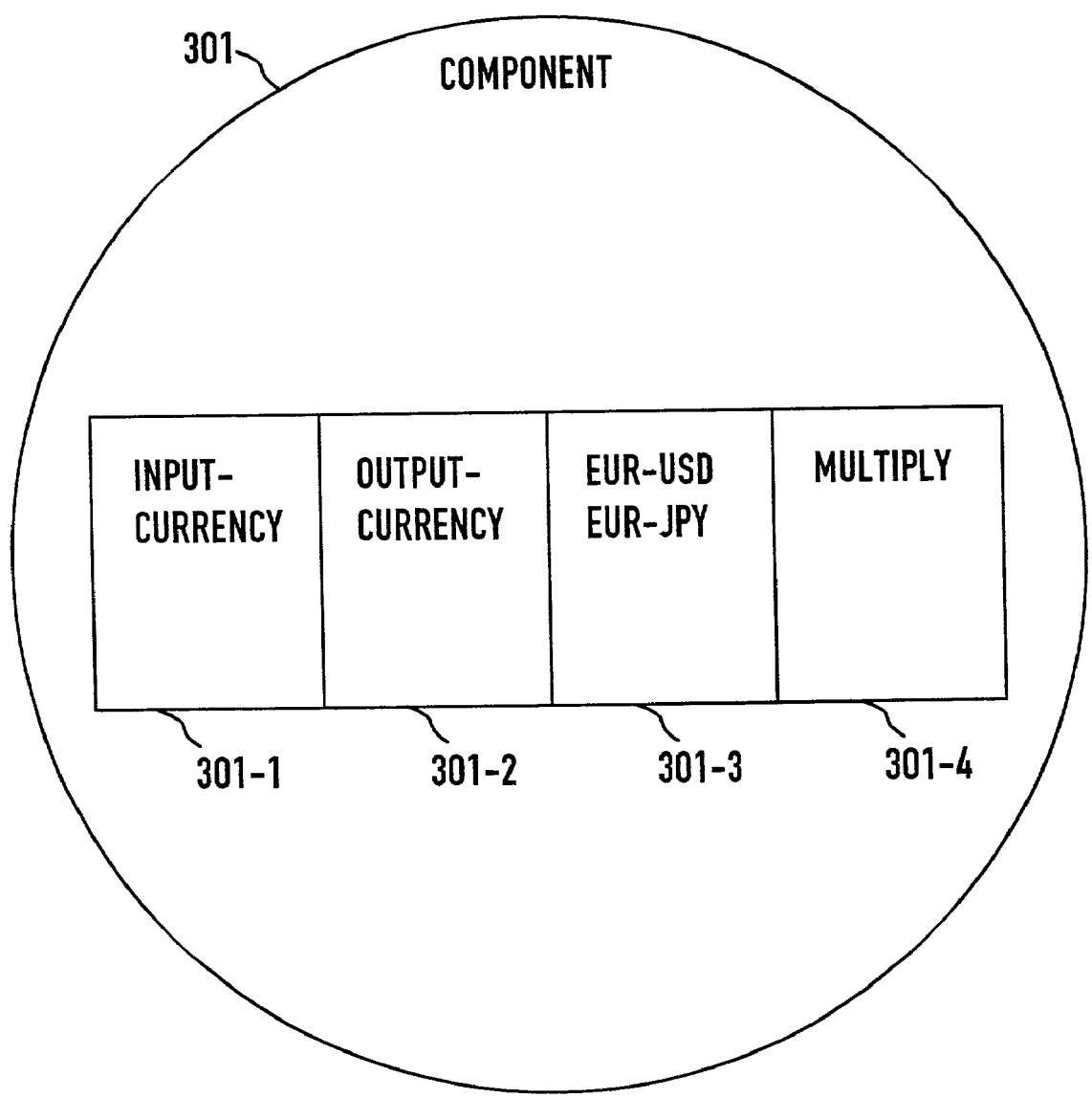
FIG. 6 illustrates the distinction of elements inside a component.

FIG. 6 illustrates the distinction of elements (e.g., 301-1 to 301-4 inside a component. For example, component 301 "rate exchange" comprises: first variable 301-1 for the input currency value "INPUT-CURRENCY"; second variable 301-2 for the output currency value "OUTPUT-CURRENCY"; conversion rates 301-3 (e.g., between EUR and USD, EUR and JPY); as well as a multiply function 301-4. Similar to the classifications above, elements in component are treated in the same way as components.

Structure

Figure 7:
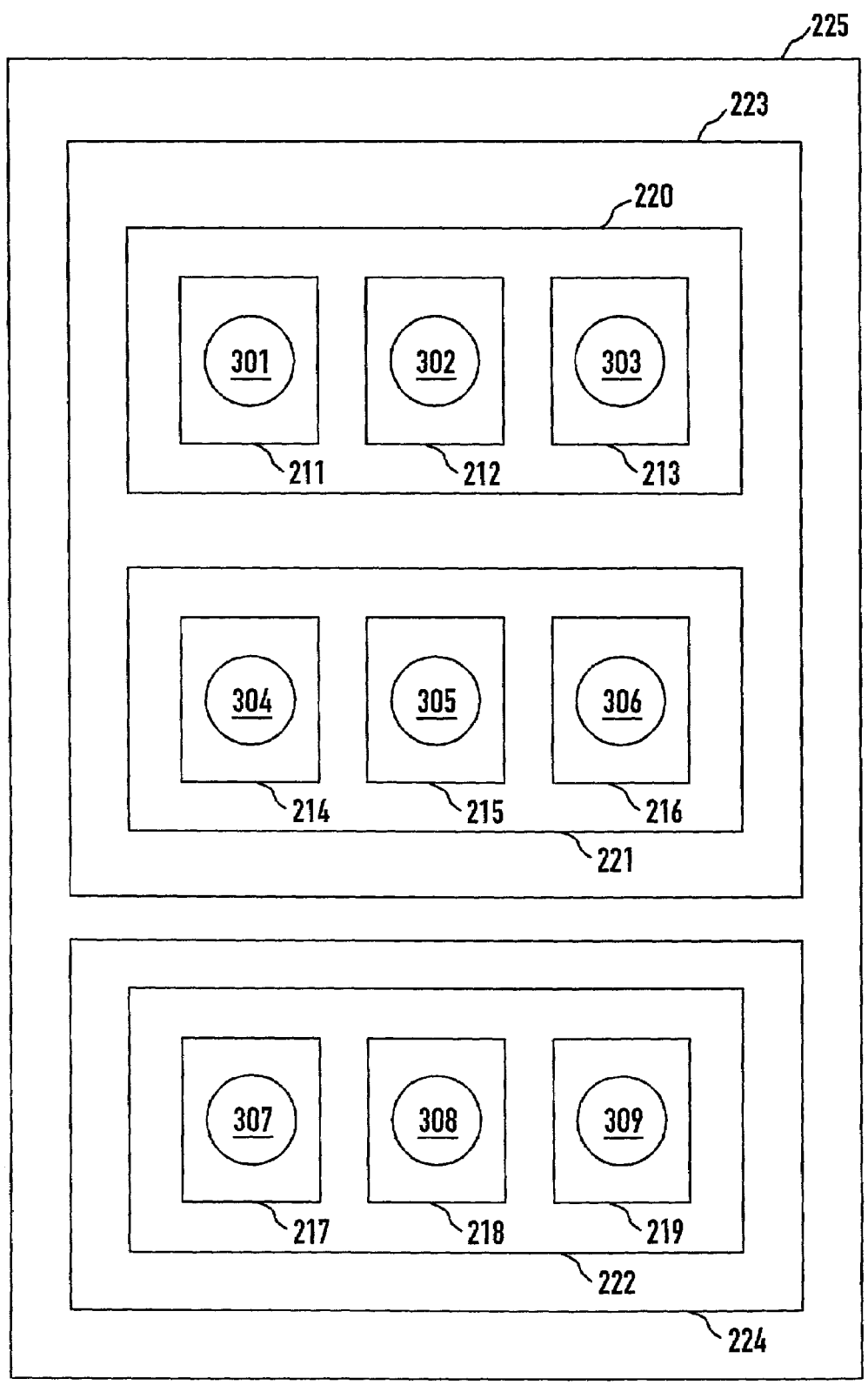
FIG. 7 illustrates a plurality of components and a plurality of descriptors in a structure by frames.
Figure 8:
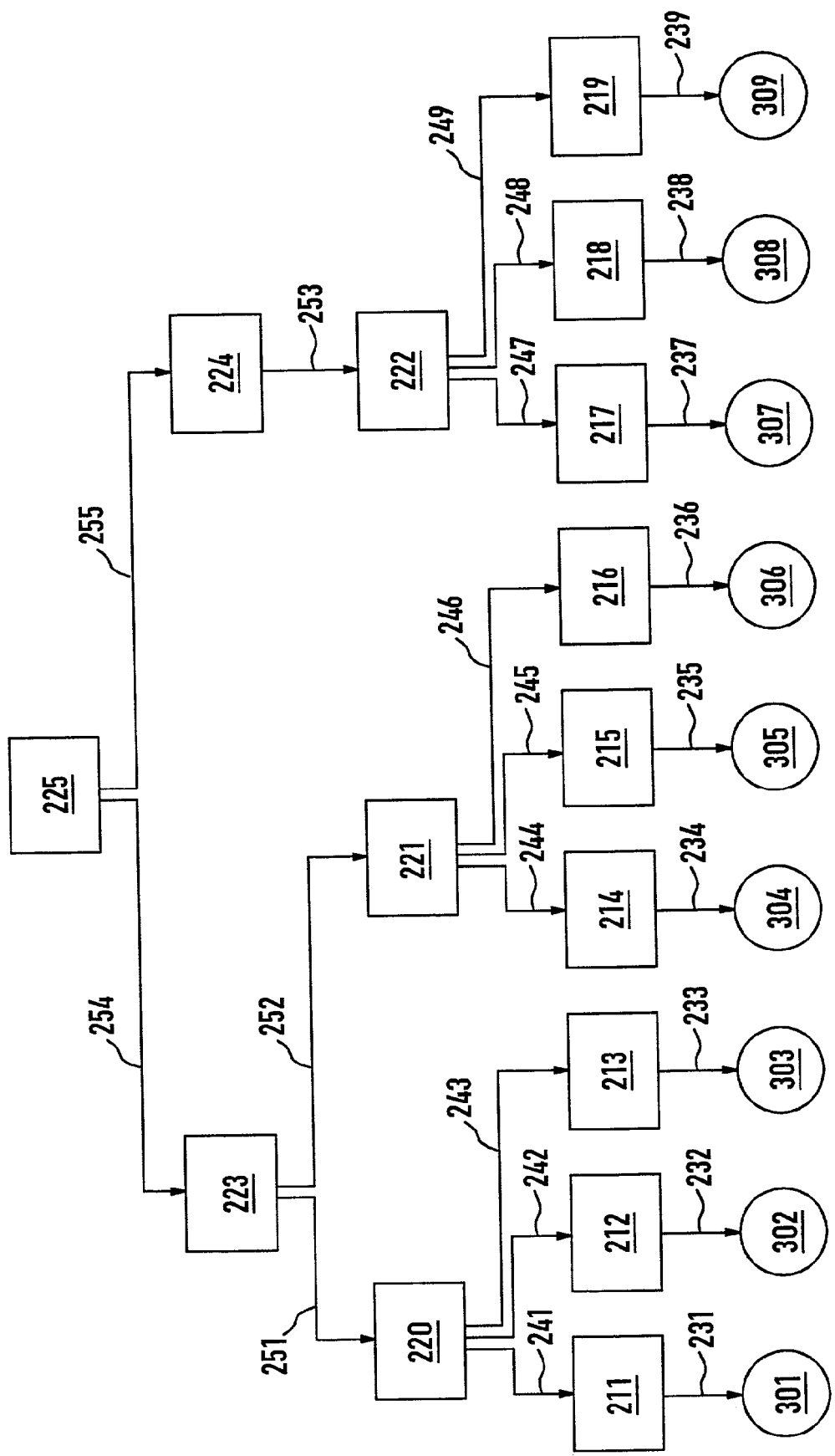
FIG. 8 illustrates the plurality of components and the plurality of descriptors in the structure by a tree.
Figure 9:
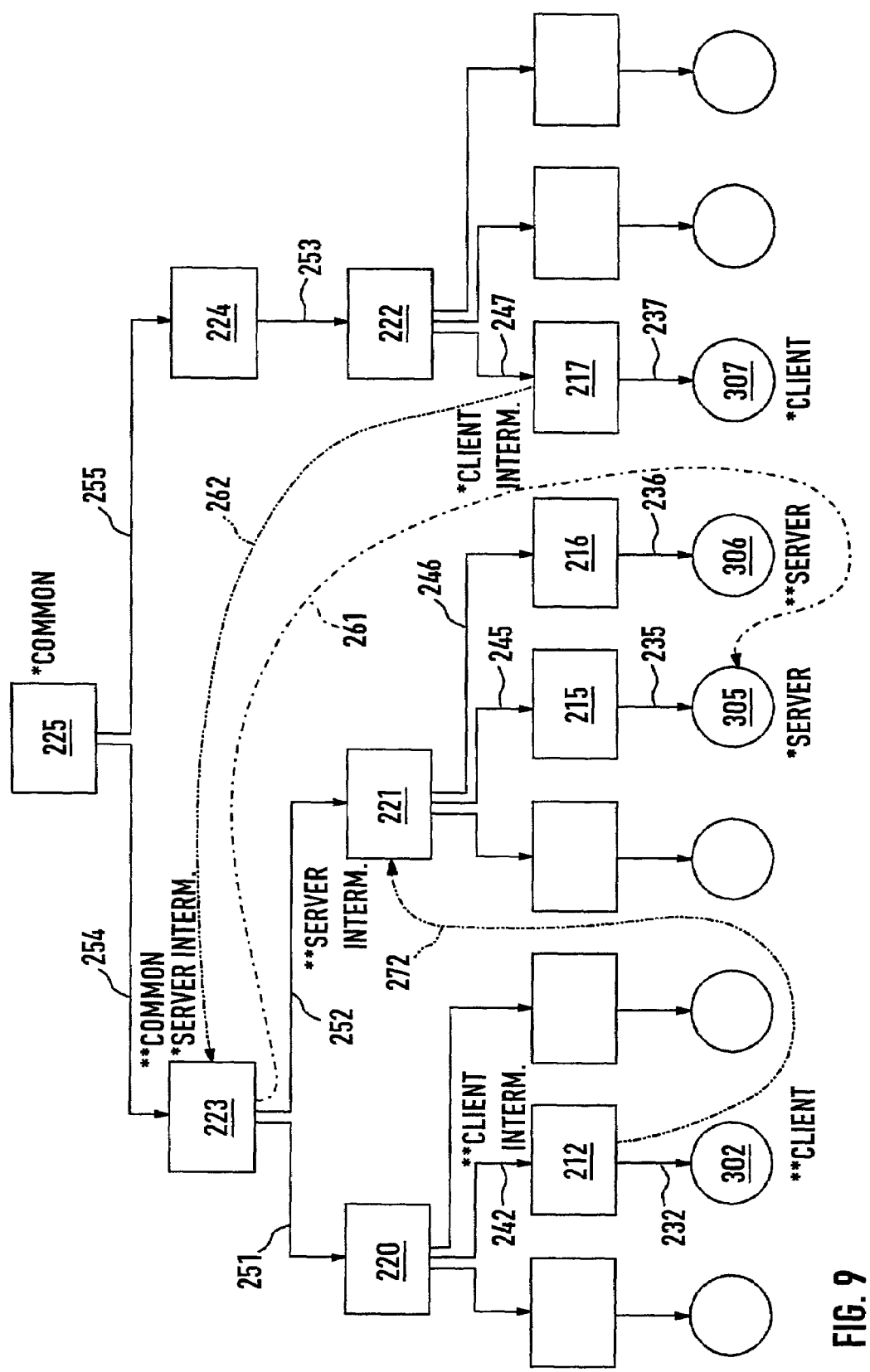
FIG. 9 illustrates the plurality of components and the plurality of descriptors in the structure of FIGS. 7–8 by a tree with declarations of first and second types.
Figure 10:
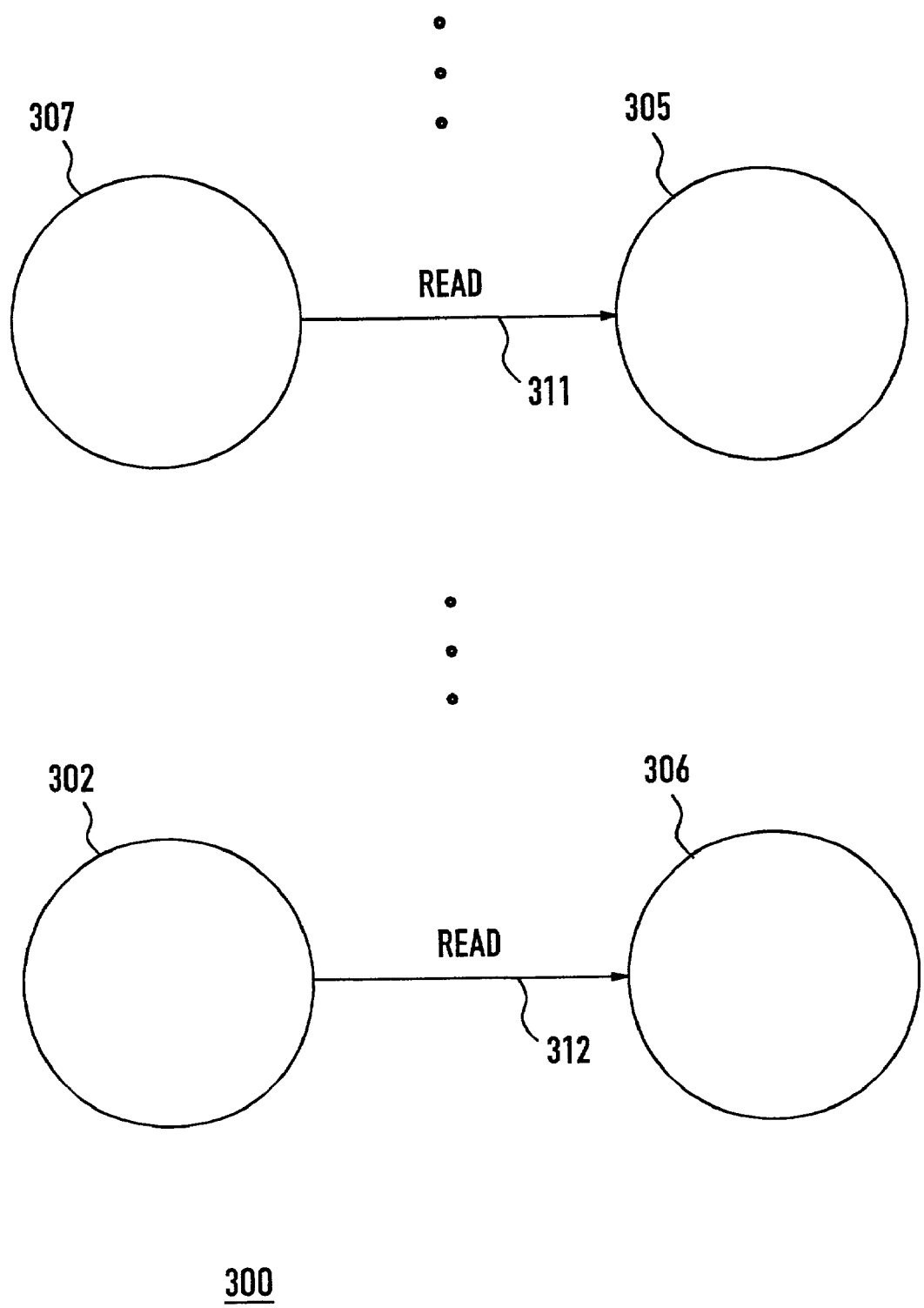
FIG. 10 illustrates an application with consecutive first and second utilizations.

FIGS. 7–10 illustrate data structure 211–272 that relates components and descriptors to each other. According to the present invention, the structure is provided by DCP 101 (cf. FIG. 4, time slot T 1) for further evaluation by PSP 102 (slot T 2). The structure comprises an assignment structure (cf. FIGS. 7–8) and declaration structures (FIG. 9). FIGS. 8–10 graphically illustrate the structure by arrows. The example in FIGS. 7–10 refers to the example of FIG. 10 with application 300 of consecutive utilizations. For explanation purposes, FIGS. 7–10 and the specification indicate first and second utilizations of application 300 by asterices * and **, respectively.

Persons of skill in the art are able to provide means to store the structure, for example, by providing assignment and declaration tables (cf. tables 1 and 2), for example, descriptor 220 stores a representation or an address of descriptor 211.

FIGS. 7–8 again illustrate the plurality of components 301–309 (cf. FIG. 5, circles) in the repository as well as illustrates the plurality of descriptors 211–225 (rectangles).

Both figures are equivalent; as in FIG. 7, the frame-style illustration of the structure is conveniently displayed to the organizer; as in FIG. 8, the tree-style illustration of the structure is more convenient for explaining the invention. Utilizations between the components as desired by the developer are not shown. FIGS. 7–8 indicate directional descriptor-to-descriptor and descriptor-to-component assignments. For convenience, the following writing conventions are used:

The phrase "a first descriptor is assigned to a second descriptor", for example, "descriptor 220 is assigned to descriptor 211" is equivalently expressed in FIGS. 7–8 as follows: In FIG. 7, first descriptor 220 encloses second descriptor 211. In FIG. 8, assignments are illustrated assignment by arrows 231–255: the first descriptor points by an assignment-arrow to the second descriptor; for example, descriptor 220 points by assignment-arrow 241 to descriptor 211. For simplicity, the phrase "by assignment-arrow" is sometimes left out.

The phrase "a descriptor is assigned to a component", for example, "descriptor 211 is assigned to component 301" is equivalent to "a descriptor encloses a component" and "a descriptor points to a component".

For convenience of explanation, it is assumed that (for descriptor-to-component assignment) a single descriptor is assigned to a single component. This is convenient for explanation, but not necessary for the present invention. Those of skill in the art can use multiple assignments.

As used herein, the term "is assigned to" comprises direct assignment (one frame, a single assignment-arrow) and indirect assignment (multiple frames, multiple assignment-arrows). In other words, each assignment-arrow 231–255 stands for a direct assignment; two are more assignment-arrows that are connected via a descriptor stand for an indirect assignment. For example, descriptor 224 is directly assigned to descriptor 222 (cf. single arrow 253); descriptor 224 is indirectly assigned (via descriptor 222) to descriptors 217, 218 and 219 (cf. arrows 253/247, 253/248 and 253/249). Descriptor 224 is also assigned to components 307, 308 and 309 (cf. arrows 253/247/237, 253/248/238 and 253/249/239). In other words, assignments are transitive.

Each assignment has an assignment depth defined as the number of direct assignments. In other words, the depth corresponds to the number of assignment-arrows. Each direct assignment has a depth of 1 (e.g., descriptor 220 to 211, arrow 241); each indirect assignment has a depth of 2 or higher (e.g., descriptor 223 to 211 with 2 arrows 251 and 241; descriptor 225 to 211 with 3 arrows).

Some descriptors are commonly assigned to multiple descriptors; for example, descriptor 223 is commonly assigned to descriptor 220 (cf. arrow 251) and to descriptor 221 (cf. arrow 252), descriptor 223 being the least deep common descriptor (dept 1). Descriptor 225 is also commonly assigned to descriptors 220 and 221, but does not qualify as the least deep common one.

The following table 1 cites the assignments of FIGS. 7–8:

TABLE 1

| | Assignments | |
|---|---|---|
| | | Assigned to descriptors and components: |
| Descriptors | Directly | Indirectly |
| 225 | 223, 224 | 220, 221, 222 211–219, 301–309 |
| 224 | 222 | 217–219, 307–309 |
| 223 | 220, 221 | 211–216, 301–306 |
| 222 | 217–219 | 307–309 |
| 221 | 214–216 | 304–306 |
| 220 | 211–213 | 301–303 |
| 211 | 301 | |
| 212 | 302 | |
| 213 | 303 | |
| 214 | 304 | |
| 215 | 305 | |
| 216 | 306 | |
| 217 | 307 | |
| 218 | 308 | |
| 219 | 309 | |

In other words, descriptors 211–219 are assigned to components 301–309, respectively (cf. assignment-arrows 231–239); descriptors 211–219 and 220–224 are assigned to descriptors 220–225 as illustrated (cf. assignment-arrows 241–255).

FIG. 9 illustrates that some descriptors have declarations. FIG. 9 also indicates the same assignment-arrows as in FIG. 8 and the same descriptors and components as in FIGS. 7–8; however, for convenience of illustration, reference numbers are only given where needed. Descriptors with declarations are referred to as "declaration-descriptors". FIG. 9 illustrates the declarations by declaration-arrows 261\*, 262\* and **272\*\*, starting at declaration-descriptors 223, 217 and 220**, respectively. Declarations are distinguished into declarations of a first type and declarations of a second type.

FIG. 9 illustrates declarations of the first type by declaration-arrow 261 with dashes and single points: -•-•-•→. A declaration of a first type is a declaration to a component, referred to as "declared-component". In the example, declaration arrow 261 goes to declared-component 305. Preferably, declarations of the first type are only allowed for declaration-descriptors that are also assigned to the declared-components. In other words, declaration-arrows are illustrated the same direction as the assignment-arrows.

FIG. 9 further illustrates declarations of the second type by declaration-arrows 262 and 272 with dashes and double points: -••-••-••→. A declaration of the second type is a declaration to a descriptor, referred to as "declared-descriptor". In the example, declaration-arrows 262 and 272 go to declared-descriptors 223 and 221, respectively.

Preferably, the declarations of the first type are visibility declarations; the declarations of the second type are usability declarations. Table 2 lists the declarations for each descriptor in the example of FIGS. 7–9. For simplicity of explanation, table 2 only lists these descriptors that are needed to obtain statements ACCESS for both utilizations 310, 311 of application 300 in FIG. 10.

TABLE 2

Declarations of first and second type

| Descriptor | First type declaration (visibility) FIG. 9 — • — • — | Second type declaration (usability) FIG. 10 — • • — • • — |
|---|---|---|
| 225 | | |
| 224 | | |
| 223* | 305* | |
| 222 | | |
| 221** | | |
| 220 | | |
| 211 | | |
| 219 | | |
| 218 | | |
| 217 | | 223* |
| 216 | | |
| 215 | | |
| 214 | | |
| 213 | | |
| 212 | | 221** |
| 211 | | |

Preferably, declaration-descriptors that are directly assigned to declared-descriptors have second type declarations to the declared-descriptors. To simplify the explanation, FIG. 9 and Table 2 do not indicate these declarations. In the example, these second type declarations are: descriptor 220 to descriptors 211, 212, and 213; descriptor 221 to descriptors 214, 215 and 216; descriptor 222 to declarations 217, 218 and 218; descriptor 223 to descriptors 220 and 221; descriptor 224 to descriptor 222; and descriptor 225 to descriptors 223 and 224.

FIG. 9 indicates text labels such as "*COMMON" and "**CLIENT" that will be explained in connection with the following.

Application

FIG. 10 illustrates application 300 with consecutive first utilization 311 and second utilization 312. Application 300 is given here in pseudo-code. The ellipses symbolize the presence of further components (e.g., 301, 309) or other inter-component relations (e.g., write, erase):

```
BEGIN            (300)
 . . .
307 READ 305     (*  311)
302 READ 306     (** 312)
 . . .
END
```

The developer wrote the first (*) utilization "307 READ 305 " to let application 300/500 provide a confidential employee list; and wrote the second (**) utilization to provide a service list to the general public.

For convenience of explanation, application 300 is stated here with a major structural error: the developer simply confused 303 with 306 in the second utilization. The prior art approach would enable the general public to get at list of all employees including their salaries. The present invention prevents this.

Method

Figure 11:
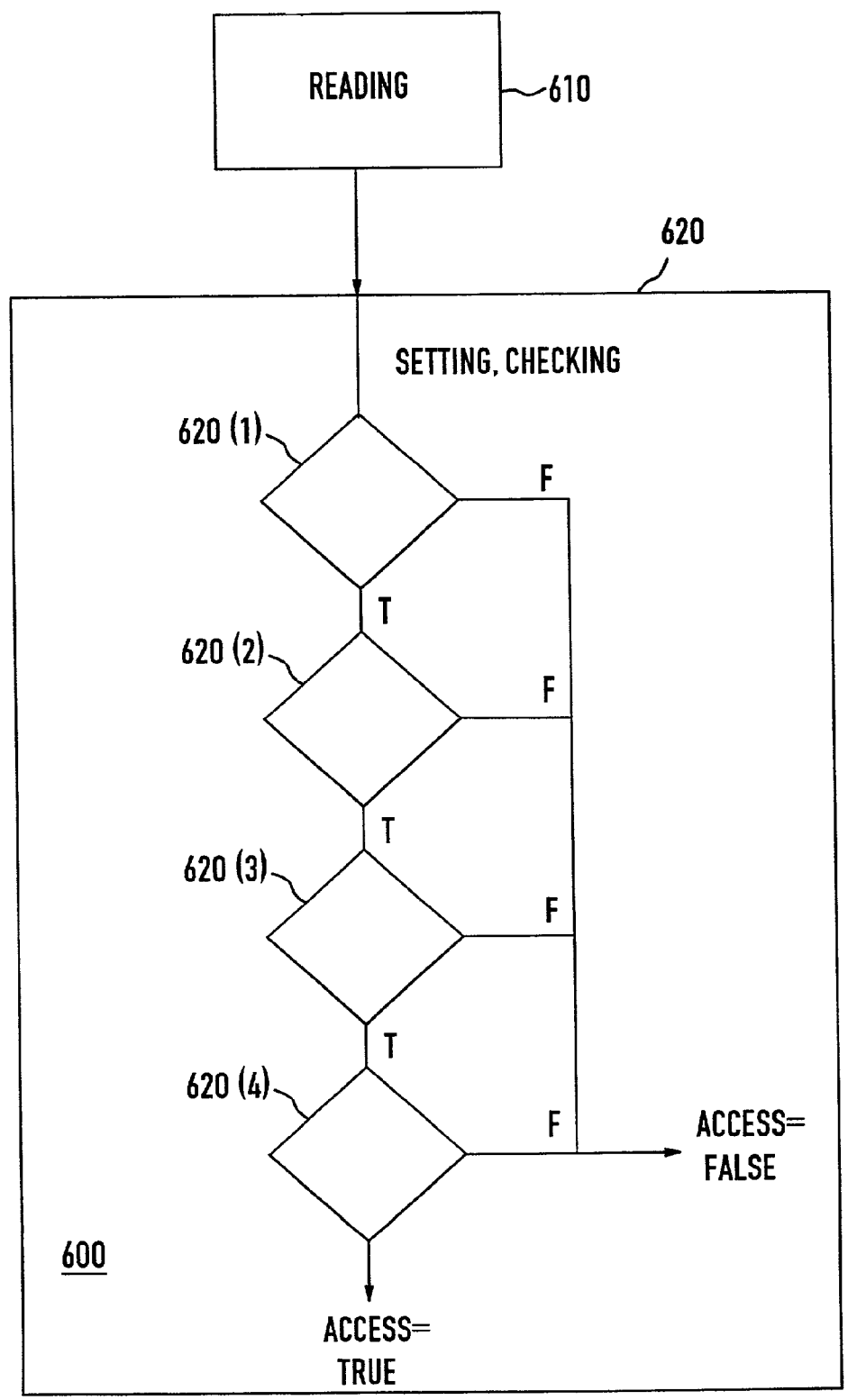
FIG. 11 illustrates a simplified flow chart diagram of a method to operate the development computer of FIG. 2 according to the present invention.

FIG. 11 illustrates a simplified flow chart diagram of method 600 to operate development computer 900 according to the present invention.

Method 600 to determine the permission statement (ACCESS) for an utilization (client component to server component) in application 300 (having a plurality of components 301–309) comprises reading step 610 and setting step 620. Setting step 620 comprises checking condition steps 620(1), 620(2), 620(3) and 620(4) leading either to result ACCESS=TRUE if conditions (1) (2) (3)and (4) are true ("T") or to result ACCESS=FALSE if et least one condition is false ("F").

In step reading 610, computer 900 reads a predefined structure wherein descriptors are assigned to components, descriptors are assigned to descriptors, some descriptors have declarations to components, and some descriptors have declarations to descriptors.

In step setting 620, computer 900 set the permission statement (ACCESS) to a predefined value when all of the following conditions are true ("T"): (1) a common descriptor is assigned to the client component and to the server component, (2) the common descriptor is assigned to a client intermediate descriptor and to a server intermediate descriptor, wherein the client intermediate descriptor is assigned to the client component, and the server intermediate descriptor is assigned to the server component, (3) the server intermediate descriptor has a first declaration to the server component, and (4) the client intermediate descriptor has a second declaration to the server intermediate descriptor.

Preferably, the first declaration is a visibility declaration, and the second declaration is a usability declaration. Preferably, in setting step 620, the statement has at least a Boolean qualifier (ACCESS), and the predefined value is "true". Preferably, the first component is a client component and the server component is a server component. Preferably, the client intermediate descriptor is directly assigned to client component.

Preferably, step setting 620 the permission statement comprises: identifying common descriptor as least deep commonly assigned descriptor; and identifying the client intermediate descriptor as being directly assigned to the client component and identifying the server intermediate descriptor such that the common descriptor is directly assigned to the server intermediate descriptor. Preferably, the declarations are chain-declarations with linearly concatenated segments (details cf. FIG. 12).

According to method 600, PSP 102 determines the permission statement (ACCESS) for the first utilization 311 "client component 307 utilizes server component 305" as follows. PSP 102 reads (step 610) the predefined structure (cf. FIG. 7–9). PSP 102 checks (step 620) the following conditions:

Condition (1) is true because: common descriptor 225 is assigned to client component 307 (cf. FIGS. 8–9, assignment-arrows 255, 253, 247, 237) and is assigned to server component 305 (assignment-arrows 254, 252, 245, 235).

Condition (2) is true because: common descriptor 225 is assigned to client intermediate descriptor 217 (cf. arrows 255, 253, 247) and to server intermediate descriptor 223 (cf. arrow 254), client intermediate descriptor 217 is assigned to client component 307 (cf. arrow 237), and server intermediate descriptor 223 is assigned to server component 305 (cf. arrows 252, 245, 235).

Condition (3) is true because: server intermediate descriptor 223 has a first declaration (cf. FIG. 9, arrow 261) to server component 305.

Condition (4) is true because: client intermediate descriptor 217 has a second declaration (cf. FIG. 9, arrow 262) to server intermediate descriptor 223.

Since all conditions (1) to (4) are true, PSP 102 sets ACCESS true.

According to method 600, PSP 102 obtains the permission statement (ACCESS) for the second () utilization "client component 302 READ server component 306" as follows. PSP 102 reads (step 610) the predefined structure (cf. FIG. 7–9). PSP 102 checks (step 620**) the following conditions:

Condition (1) is true because: common descriptor 223 is assigned to client component 302 (cf. FIG. 9, arrows 251, 242, 232) and is assigned to server component 306 (arrows 252, 246, 236).

Condition (2) is true because: common descriptor 223 is assigned to client intermediate descriptor 212 (arrows 251, 242) and to server intermediate descriptor 221 (arrow 252), client intermediate descriptor 212 is assigned to client component 302 (arrow 232) and server intermediate descriptor 221 is assigned to server component 306 (arrows 246, 236).

Condition (3) is false because: server intermediate descriptor 221 does not have a first declaration to server component 306.

Condition (4) is true because: client intermediate descriptor 212 has a second declaration (arrow 272) to server intermediate descriptor 221. (Checking (4) is actually not required.)

Since at least one the conditions is false, PSP 102 sets ACCESS is set false.

PREFERRED EMBODIMENT

Figure 12:
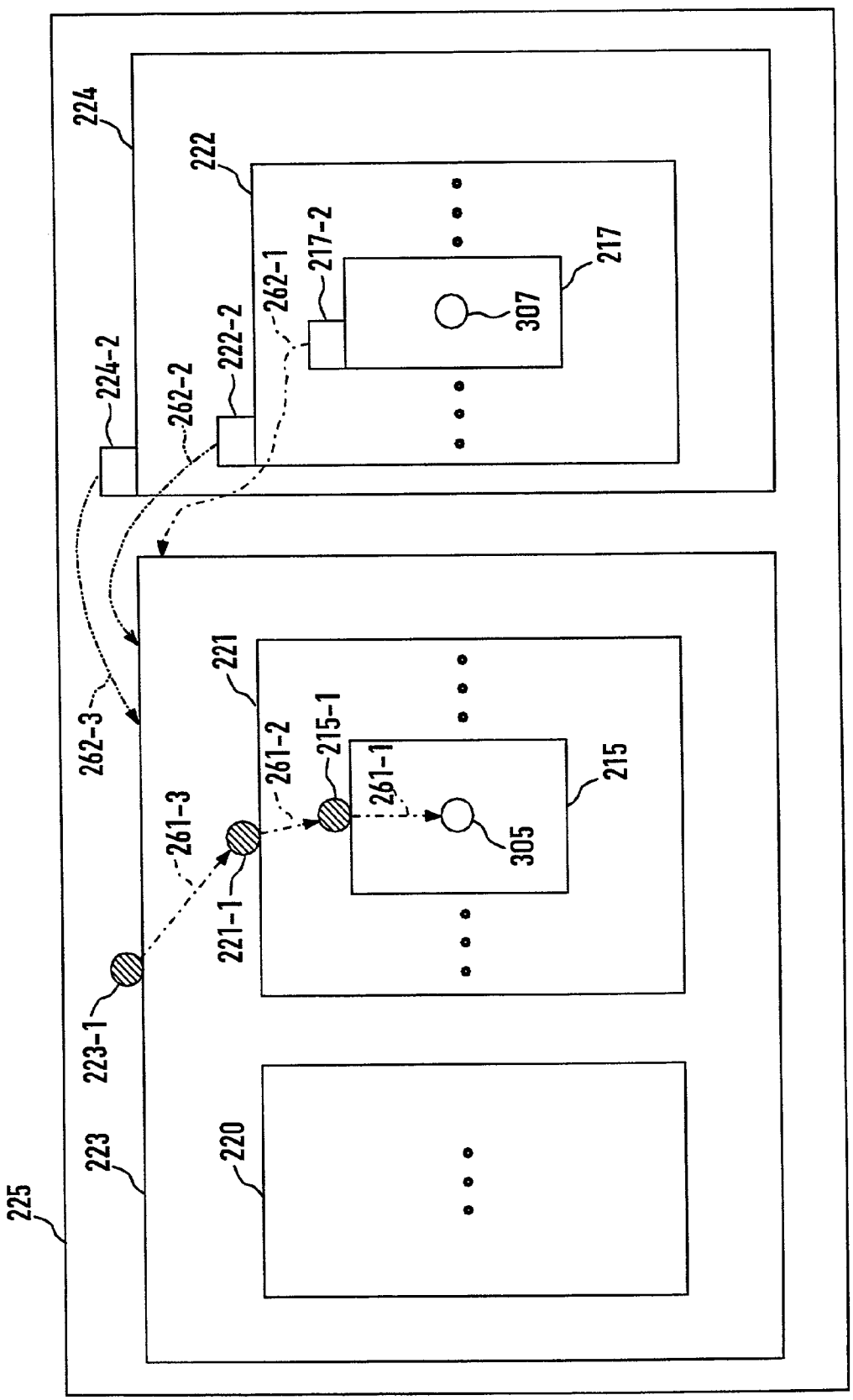
FIG. 12 illustrates components, descriptors and the structure in a preferred embodiment of the present invention.

FIG. 12 illustrates components, descriptors and the structure in a preferred embodiment of the present invention. Using the frame-style, FIG. 12 illustrates: client component 307 and server component 305, as well as illustrates descriptors 220, 221, 222, 223, 224 and 225 (225 least deep commonly assigned to 305 and 307). Similar to FIG. 9, the example of FIG. 12 also refers to utilization 311 in FIG. 10. The function of the declarations is similar. However, the declarations are chain-declarations and descriptors have dedicated interfaces for each declaration type. The chain-declarations have segment declarations that are linearly concatenated.

Descriptors 215, 221 and 223 have visibility interfaces 215-1, 221-1 and 223-1, respectively, for storing segment-declarations 261-1, 261-2 and 261-3, respectively so that component 305 is visible (first type) by descriptor 223 (server intermediate).

Descriptors 217, 222 and 224 have usability interfaces 217-2, 222-2, and 224-2, respectively, for storing segment-declarations 262-1, 262-2, and 262-3, respectively so that component 307 can take usage (second type) of descriptor 223.

For compliance with condition (4), the existence of declaration 262-1 from descriptor 317 to descriptor 223 is required. It is however convenient, to first check the existence of declaration 262-3 from descriptor 224 (directly assigned to common descriptor 225) to descriptor 223 and second to check the existence of declaration 262-2 from descriptor 222 to descriptor 223. This multi-step approach is convenient in case many descriptors (such as 217) are assigned deeply. It can be defined that a non-existence of a high-level descriptor (such as 262-3) precludes the existence of lower-level descriptors (such as 262-1).

Data structure 211–272 of the present invention is summarized as a data structure to evaluate software application 300 that has a plurality of components 301–309 (Conveniently, reference numbers refer to utilization 311). Data structure 211–272 implicitly has a permission statement ACCESS for at least single utilization 311 of server component 305 by client component 307, data structure 211–272 has descriptors 211–225 that are independent from components 301–309, data structure 211–272 is characterized by the following:

In assignment structure 231–255, descriptors 211–219 are assigned 231–239 to components 301–309, and descriptors 220–225 are assigned 241–255 to descriptors 211–224. In first declaration structure 261, some descriptors 223 have declarations to components 305, and in second declaration structure 271, some descriptors 217 have declarations to descriptors 223. Permission statement ACCESS is only true when all of the following conditions are true: (1) in the assignment structure, common descriptor 225 is assigned to client component 307 and to server component 305, (2) in the assignment structure, common descriptor 225 is assigned to client intermediate descriptor 217 and to server intermediate descriptor 223, wherein client intermediate descriptor 217 is assigned to client component 307, and server intermediate descriptor 223 is assigned to server component 305, (3) in the first declaration structure, server intermediate descriptor 223 has first declaration 261 to server component 305, and (4) in the second declaration structure, client intermediate descriptor 217 has second declaration 262 to server intermediate descriptor 223.

Figure 13:
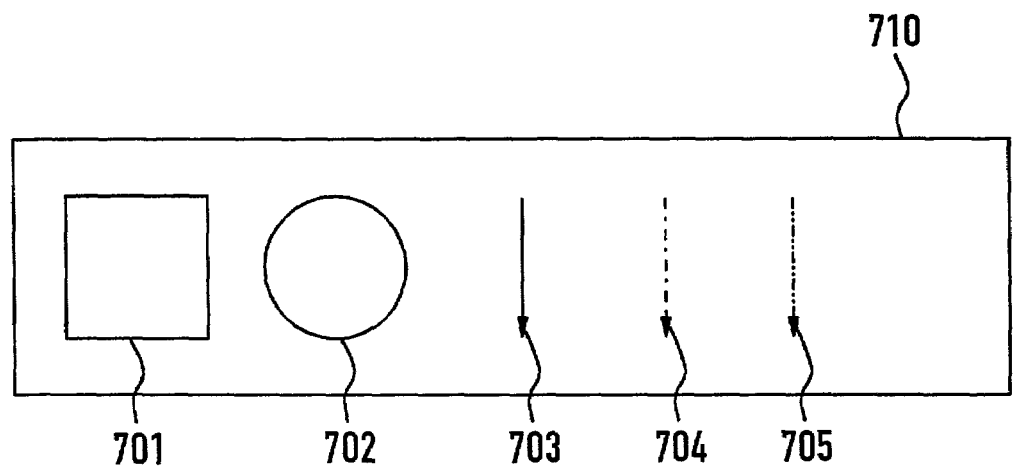
FIG. 13 illustrates a simplified screen diagram of the operation of a descriptor creation program that assists an organizer to define a structure used by the present invention.
Figure 13:
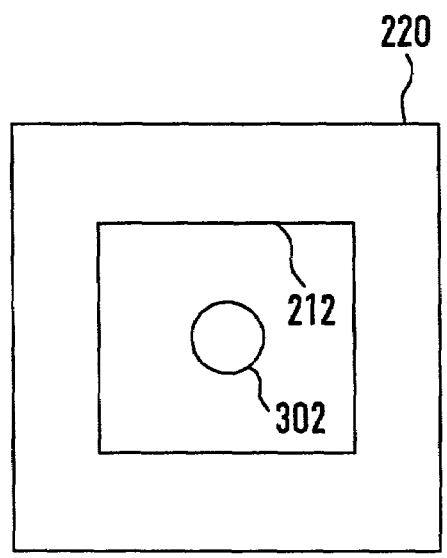

FIG. 13 illustrates a simplified screen diagram of the operation of descriptor creation program 101 that assists the organizer to define a data structure used by the present invention. For example, screen diagram 700 is displayed by development computer 900 on display 950 with icon bar 710. Bar 710 has square symbol 701 for a descriptor, a circle symbol 702 for a component, arrow symbol 703 for an assignment, arrow symbols 704–705 for declarations of first and second types, respectively. Developer is invited to select symbols and place them in graphical order, for example, as indicated for descriptors 220 and 212 for component 302. It does not matter whether diagram 700 resembles the illustration of FIGS. 7–12, in any case, pressing a SAVE or other interface element stores the structure into memory. Persons of skill in the art can provide a different visual appearance of screen 700 without departing from the scope of the present invention.

List of Reference Numbers

| Item | Reference | FIG. |
|---|---|---|
| conditions | (1) (2) (3) (4) | CLAIM |
| computer program product (CPP): development program | 100 | 1, 2 |
| computer program product: descriptor creation program (DCP) | 101 | 2 |
| computer program product: permission statement program | 102 | 2 |
| descriptors | 211–225 | 2, 7, 8, 9, 12 |
| structure | 211–272 | 7–9 |
| visibility interfaces | 215-1, 221-1, 223-1 | |
| client intermediate descriptor | 217*, 212** | |
| usability interfaces | 217-2, 222-2, 224-2 | 12 |
| server intermediate descriptor | 223*, 221** | 9 |
| common descriptor | 225*, 223** | |
| assignment-arrows | 231–239, 241–249, 251–255 | 8, 9 |
| declaration to server component | 261 | 9 |
| declaration arrows | 261, 262, 272 | 9 |
| segment declaration (first type) | 261-1, 261-2, 261-3 | 12 |
| declaration to server intermediate descriptor | 262 | 9 |
| segment declaration (second type) | 262-1, 262-2, 262-3 | 12 |

-continued

List of Reference Numbers

| Item | Reference | FIG. |
|---|---|---|
| application | 300, 300', 500 | 2, 10 |
| variable for input currency value | 301-1 | 6 |
| variable for output currency value | 301-2 | |
| conversion rates | 301-3 | 6 |
| group of components | 301–303 | 5 |
| components | 301–309 | 2, 5, 7, 8 |
| multiply function | 301-4 | 6 |
| group of components | 304–306 | 5 |
| group of components | 307–309 | 5 |
| client component | 30X, *307, **302 | 3 |
| server component | 30Y, *305, **306 | 3 |
| utilization direction | 310 | 3 |
| first utilization | 311 | 10 |
| second utilization | 312 | 10 |
| repository | 399 | 2 |
| compiler | 400 | 2 |
| method | 600 | 11 |
| step reading | 610 | 11 |
| step setting | 620 | 11 |
| screen diagram | 700 | 13 |
| symbols | 701–705 | 13 |
| development computer | 900 | 2 |
| computers | 900, 901, 902 | 1 |
| front-end computer | 902 | 2 |
| database computer | 903 | 2 |
| processor | 910 | 1 |
| memory | 920 | 1, 2 |
| memory | 921 | 2 |
| bus | 930 | 1 |
| input device | 940 | 1 |
| output device | 950 | 1 |
| output device | 950 | 1 |
| user interface | 960 | 1 |
| carrier | 970 | 1 |
| program carrier | 970, 971 | 1 |
| program signal | 980 | 1 |
| program signal | 980, 981, 982 | 1, 2 |
| inter-computer network | 990 | 1 |
| network | 990 | 1 |
| computer network system | 999 | 1 |
| computer system | 999 | 1 |
| permission statement | ACCESS | CLAIM |

The invention claimed is:

1. A computer-implemented method for determining a permission statement for an utilization in an application that has a plurality or components, the utilization being predefined from a client component to a server component, the method comprising the steps of:

reading a predefined structure wherein
 descriptors are assigned to components, descriptors are assigned to descriptors,
 some descriptors have declarations to components, and some descriptors have declarations to descriptors; and setting the permission statement to a predefined value when all of the following conditions are true:
(1) a common descriptor is assigned to the client component and to the server component,
(2) the common descriptor is assigned to a first intermediate descriptor and to a second intermediate descriptor, wherein the first intermediate descriptor is assigned to the client component, and the second intermediate descriptor is assigned to the server component,
(3) the second intermediate descriptor has a first declaration to the server component,
(4) the first intermediate descriptor has a second declaration to the second intermediate descriptor.

2. The method of claim 1, wherein the first declaration is a visibility declaration, and the second declaration is a usability declaration.

3. The method of claim 1, wherein descriptors store the visibility declaration in a visibility interface and store the usability declaration in a usability interface.

4. The method of claim 1, wherein in the setting step, the statement has at least a Boolean qualifier, and wherein the predefined value is true.

5. The method of claim 1, wherein the first intermediate descriptor is directly assigned to the client component.

6. The method of claim 1, wherein the step setting the permission statement comprises:
 identifying the common descriptor as least deep commonly assigned descriptor; and
 identifying the first intermediate descriptor as being directly assigned to the client component and identifying the second intermediate descriptor such that the common descriptor is directly assigned to the second intermediate descriptor.

7. The method of claim 1, wherein the declarations are chain-declarations with linearly concatenated segments.

8. A data structure stored on a computer-readable medium which, when executed by a computer, performs a method for evaluating a software application that has a plurality of components, the data structure implicitly having a permission statement for at least single utilization of a server component by a client component, the data structure having descriptors that are independent from the components, the data structure being characterized in that:
 in an assignment structure, descriptors are assigned to components, and descriptors are assigned to descriptors;
 in a first declaration structure, some descriptors have declarations to components, and
 in a second declaration structure, some descriptors have declarations to descriptors;
 the permission statement is only true when all of the following conditions are true: (1) in the assignment structure, a common descriptor is assigned to the client component and to the server component, (2) in the assignment structure, the common descriptor is assigned to a client intermediate descriptor and to a server intermediate descriptor, wherein the client intermediate descriptor is assigned to the client component, and the server intermediate descriptor is assigned to the server component, (3) in the first declaration structure, the server intermediate descriptor has a first declaration to the server component, and (4) in the second declaration structure, the client intermediate descriptor has a second declaration to the server intermediate descriptor.

9. A computer-readable medium that stores a set of instructions which, when executed by a computer, performs a process for developing a software application from software components, wherein the validity of component interactions is automatically validated, the process being performed in consecutive time slots with the following actions:
 in a first time slot, a first person uses a descriptor creation program to define descriptors in a data structure;
 in a second time slot, a second person writes the application by defining utilizations between the components;
 in a third time slot, a permission statement program automatically reads the application in combination with the descriptors and issues at least one permission statement for at least one of said utilizations; and a fourth time slot, depending on the at least one permission statement, a compiler compiles the application.

10. The process of claim 9, wherein in the first time slot, the data structure has an assignment structure in that descriptors are assigned to components, and descriptors are assigned to descriptors; in a first declaration structure, some descriptors have declarations to components, and in a second declaration structure, some descriptors have declarations to descriptors; the at least one permission statement is only true when all of the following conditions are true: (1) in the assignment structure, a common descriptor is assigned to a client component and to a server component, (2) in the assignment structure, the common descriptor is assigned to a client intermediate descriptor and to a server intermediate descriptor, wherein the client intermediate descriptor is assigned to the client component, and the server intermediate descriptor is assigned to the server component, (3) in the first declaration structure, the server intermediate descriptor has a first declaration to the server component, and (4) in the second declaration structure, the client intermediate descriptor has a second declaration to the server intermediate descriptor.

11. A computer program product embodied on a computer readable medium for determining a permission statement for a predefined utilization from a client component to a server component in an application with a plurality of components, the computer program product having a plurality of instructions that cause a processor to perform the following steps:
  reading a predefined structure wherein
    descriptors are assigned to components, descriptors are assigned to descriptors,
    same descriptors have declarations to components, and some descriptors have declarations to descriptors;
  a first checking step to verify that a common descriptor is assigned to the client component and to the server component,
  a second checking step to verify that the common descriptor is assigned to a client intermediate descriptor and to a server intermediate descriptor, wherein the client intermediate descriptor is assigned to the client component, and the server intermediate descriptor is assigned to the server component,
  a third checking step to verify that the server intermediate descriptor has a first declaration to the server component,
  a fourth checking step to verify that the client intermediate descriptor has a second declaration to the server intermediate descriptor;
  selectively setting the permission statement to a true value when all checking steps are completed successfully, and otherwise setting the permission statement to a false value.

12. The computer program product of claim 11, causing the processor in the third checking step to read the first declaration as a visibility declaration, and in the fourth checking step, to read the second declaration as a usability declaration.

13. The computer program product of claim 11, causing the processor to perform the step setting permission statement as follows:
  identifying the common descriptor as least deep commonly assigned descriptor; and
  identifying the first intermediate descriptor as being directly assigned to the client component and identifying the second intermediate descriptor such that the common descriptor is directly assigned to the second intermediate descriptor.

14. A computer system for determining a permission statement for a predefined utilization from a client component to a server component in an application with a plurality of components, the computer system comprising
  means for reading a predefined structure wherein
    descriptors are assigned to components, descriptors are assigned to descriptors,
    some descriptors have declarations to components, and some descriptors have declarations to descriptors; and
  means for setting the permission statement to a predefined value when all of the following conditions are true:
    (1) a common descriptor is assigned to the client component and to the server component,
    (2) the common descriptor is assigned to a first intermediate descriptor and to a second intermediate descriptor, wherein the first intermediate descriptor is assigned to the client component, and the second intermediate descriptor is assigned to the server component,
    (3) the second intermediate descriptor has a first declaration to the server component,
    (4) the first intermediate descriptor has a second declaration to the second intermediate descriptor.

15. The computer system of claim 14, wherein the means for setting the statement set the statement to at least a Boolean qualifier in that the predefined value is true.

16. The computer system of claim 14, wherein the means for setting the permission statement comprises:
  means for identifying the common descriptor as least deep commonly assigned descriptor; and
  means for identifying the first intermediate descriptor as being directly assigned to the client component and identifying the second intermediate descriptor such that the common descriptor is directly assigned to the second intermediate descriptor.

* * * * *